3,301,676
PROCESS AND MATERIAL FOR THE PRODUCTION OF ELECTROPHOTOGRAPHIC IMAGES
Martha Tomanek, Wiesbaden-Biebrich, Germany, assignor, by mesne assignments, to Azoplate Corporation, Murray Hill, N.J.
No Drawing. Filed Oct. 9, 1964, Ser. No. 402,954
Claims priority, application Germany, Oct. 12, 1963, K 51,074
19 Claims. (Cl. 96—1.5)

The present invention relates to a process for the production of images and a material for use in the process. In the process, a latent electrostatic image is produced on a sublimable coating applied to a support, the image is made visible and fixed, the coating being sublimed off during or after fixing.

Sublimable coatings on which a latent electrostatic image can be produced are of importance in technology since, especially in printing, decoating of the non-image areas which are not intended to print must usually be carried out in order to bare the water-accepting surface in these areas. Solvents are generally employed for this purpose, but the use of solvents, above all in the case of image areas which can be fixed thermally or with vapors, is always attended by the risk that the image areas may be washed away, so that damage or removal, namely of fine lines, may occur. In addition to this, it is generally desirable to improve the optical impression of a copy by removal of the photoconductive coating. Dissolving away of the photoconductive coating, in most cases, can be carried out only with difficulty, in view of the fact that the paper usually has not been specially treated.

As sublimable coatings on which a latent electrostatic image can be produced, inorganic substances such as sulfur have been proposed in electrophotography. Organic substances, such as anthracene, have also been used for these purposes. In these cases, the unsatisfactory properties of the sublimable substances are disadvantageous, above all their completely insufficient properties as regards the formation of coatings, their high sublimation temperature, the health hazards of the vapors and the insufficient light-sensitivity thereof.

The present invention provides a process for the production of an image using a latent electrostatic image, in which a support is coated with a sublimable coating which consists of or contains at least one compound of the following general formula:

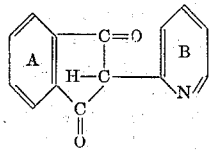

wherein the rings A and B may be substituted by at least one condensed and/or uncondensed aromatic, substituted or unsubstituted hydrocarbon group and/or by one aliphatic and/or one other inert group, and the coating may contain, in addition, sublimable additives for increasing the sensitivity and/or improving the coating. A latent electrostatic image is then produced on the coating, using the effect of electricity and the action of image-wise differentiated light beforehand, simultaneously or subsequently, and the image is made visible and fixed by conventional means, the coating being sublimed off before, during or after fixing.

The present invention also provides a material for use in the process of the invention. This material comprises a support and a sublimable coating thereon, the latter consisting of or containing at least one compound of the above general formula.

By means of the present invention there is achieved in an advantageous manner the subliming off of the light-sensitive coating rapidly and completely, at a relatively low temperature, before, during, or after the fixing of the image areas. This subliming off may be carried out in one operation simultaneously with the fixing of the powder particles in the image areas. The resin-like thermally fixable powders or the inorganic pigments which are fixed by solvent vapors unite firmly with the support in the image areas, so that there is no impairment of the marginal sharpness and covering power of the image areas themselves.

The invention therefore renders it possible to use reproduction coatings which hitherto were not suitable for this purpose since they exhibit, for example, too strong a coloration, as a result of which an image with good contrast was not obtained. The optical and mechanical impression of the finished image is also improved by the treatment of the invention. The invention is of particular significance in the field of printing, the conventional procedure of decoating with solvents being unnecessary. Furthermore, for example in cases where inorganic particles are used for making the latent image visible and where a suitable support is used, the inorganic particles can be sintered or fused to the support, the coating subliming off completely beforehand during the thermal treatment. Advertising boards, for example, may be produced in this manner.

By a latent electrostatic image is meant a change in an insulating or photoconductive material with regard to its electrical properties. A latent electrostatic image may be produced by electrostatically charging a photoconductive coating on a supporting material, the photoconductive coating being known, for example, from electrophotography and being, if desired, differentiated by image-wise exposure. The image-wise modified electrostatic areas may be produced, for example, by image-wise exposure of a suitable coating while a direct current voltage is simultaneously applied to the coating. The basic principles of this method are described in the book, "Photoelectrets and the Electrophotographic Process," by V. M. Fridkin and I. S. Zheludev (1961), Library of Congress Catalog Card Number 61–10020, and H. Kallmann, B. Rosenberg: "Persistent Internal Polarization," Phys. Rev. 1955, pages 1596–1610.

The aromatic hydrocarbon group in the above general formula, which may be condensed if desired, may be, for example, a phenyl group. This aromatic hydrocarbon group may be substituted one or more times, for example by an amino, alkylamino, or dialkylamino group, such as a methylamino, propylamino, dimethylamino, diethylamino, dipropylamino, or methylbutyl amino group. The aromatic rings may, in addition, be substituted by, for example, halogen and/or by short-chain aliphatic hydrocarbon and/or alkoxy and/or oxyalkyl groups, such as methyl, ethyl, propyl, methoxy, or oxymethyl groups.

Other suitable substituents for the rings designated A and B are, preferably, aliphatic groups, for example methyl, ethyl, propyl, and butyl groups, also alkoxy groups, such as methoxy, propoxy, and butoxy; or halogen such as chlorine and bromine.

Exemplary of specific compounds useful in the present invention are:

Formula 1

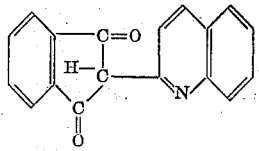

2-(1,3-dioxo-hydrindyl - (2)) - quinoline, melting point= 240° C.

Formula 2

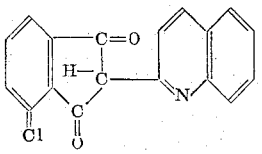

2-(4-chlor - 1,3 - dioxo-hydrindyl-(2))-quinoline, melting point=271–272° C.

Formula 3

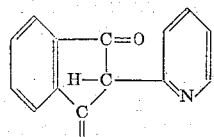

2-(1,3-dioxo-hydrindyl - (2)) - pyridine, melting point= 287° C.

Formula 4

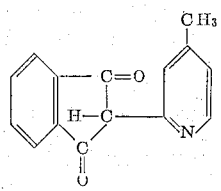

4-methyl-2-(1,3-dioxo-hydrindyl - (2)) - pyridine, melting point=262° C.

Formula 5

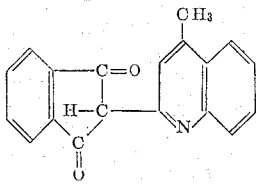

4-methyl-2-(1,3-dioxo-hydrindyl-(2)) - quinoline, melting point=237–238° C.

The following compounds also give good results:

4-methyl-6-ethyl-(1,3-dioxo-hydrindyl-(2))-pyridine.
5-propyl-(1,3-dioxo-4-chlor-hydrindyl-(2))-pyridine,
3-methoxy-(1,3-dioxo-hydrindyl-(2))-pyridine,
4-methoxy-2-(1,3-dioxo-hydrindyl-(2))-quinoline,
4-ethyl-6-methyl-2-(1,3-dioxo-hydrindyl-(2))-quinoline, and
5-methyl-2-(5-methoxy-1,3-dioxo-hydrindyl-(2))-quinoline.

Mixtures of these compounds may also be used.

The compounds according to the invention are known, some of them being, for example, described in Ber. der Dtsch. Chem. Ges., 16 (1883), page 1082. In order to prepare the compounds of the invention, for example, suitable heterocyclic compounds with a reactive methyl group are condensed on the one hand and o-dicarboxylic acid anhydrides on the other. This condensation can, for example, be carried out by heating 1 mole of a heterocyclic compound with a reactive methyl group and 1 mole of an o-dicarboxylic acid anhydride together with about 20–40 g. of anhydrous zinc chloride for 3–5 hours at 180–200° C. After completion of the reaction, the melt is comminuted and boiled once or twice with water, using 1 liter of water each time, in order to remove the zinc chloride. Further modified methods of preparation can be found in Lieb. Ann. Chem., 315 (1901), page 336.

The compounds sublime between about 200 and 300° C. This sublimation takes place very rapidly, easily and completely; practically no decomposition occurs. The sublimation is in accordance with known physical laws, dependent on pressure, so that in a vacuum substantially more favorable results are obtained.

The compounds of the invention may be used alone or in admixture with sublimable additions for improving the coating or increasing the sensitivity. Suitable additives for improving the coating are, for example, natural resins such as colophony or specific organic acids such as benzoic acid or phthalic acid.

Additives for increasing the sensitivity include the known sensitizers, provided they can be sublimed. Such sensitizers, which are usually dyes, are known, for example, from Belgian Patent No. 558,078, while the properties of the dyes are given, for example, in the Colour Index. Suitable sensitizers can be found, for example, in the class of stilbene, pyrazolone and triphenylmethane dyes. Methyl violet and Rhodamine B extra, for example, are particularly suitable.

The proportions of the light-sensitive substances and the components for increasing sensitivity and improving the coating may vary within wide limits. For example, a ratio between 100:1 to 1:20 by weight has proved advantageous. Exemplary of supports for the coatings of the invention are foils of metals such as aluminum, zinc, and copper; cellulose products such as paper, cellulose hydrate, or cellulose esters such as cellulose acetate and cellulose butyrate; or plastics, such as polyolefins, for example polyethylene and polypropylene; polyvinyl compounds such as polyvinyl chloride, polyvinylidene chloride, and polystyrene; polyacrylic compounds such as polyacrylonitrile, and polymethacrylate; polyesters such as polyterephthalic acid ester; and polyamides and polyurethanes, especially after application or introduction of substances which increase the electrical conductivity. So-called conductive glass is also very suitable as a coating support.

If paper is used as support material, it is advisable to pretreat it to prevent penetration by the coating solutions. Films coated with metal, for example aluminum, or provided by vacuum deposition with a layer of a metal such as aluminum, are also very suitable for these purposes.

The material of the invention is advantageously prepared by dissolving the sublimable compounds in an organic solvent such as benzene, acetone, methylene chloride, ethyleneglycol monomethyl ether or mixtures of such solvents and coating the support material therewith in a conventional manner, for example by dipping, spraying on, spreading on, or by roller application, and then drying, a uniformly homogeneous coating being formed. The light-sensitivity of these coatings lies mainly in the short-wave range of the visible spectrum and extends into the long-wave ultraviolet range.

In order to prepare copies with the material of the invention, the light-sensitive coating is charged, for example by a corona discharge at a potential of 6,000–7,000 volts. The coating is then exposed in contact with an original or by episcopic or diascopic projection of an original, a latent electrostatic image corresponding to the original being formed. This invisible image is developed by contacting it in a conventional manner with a developer consisting of a carrier and a toner. The developer may also consist of a resin or pigment suspended in a dielectric liquid. The image thus made visible is fixed, for example by heating with an infra-red radiator to about 100–200° C., or by treatment with solvent vapors such as trichloroethylene, carbon tetrachloride or ethyl alcohol, or water vapor. Images are obtained which correspond to the originals and are distinguished by good contrast. The images obtained may be converted into printing plates after fixing by the following procedure:

The fixed image is again exposed to the action of heat, for example between 200–300° C. After a short time the light-sensitive coating in the non-image areas is sublimed off and when suitable supports are used, water-acceptance is immediately achieved in these areas. The subliming off may also be effected simultaneously with the fixing of the powder which is used for making the latent image visible. In this way, printing plates are obtained from which good copies may be produced in an offset machine.

Also, for the production of copies which are not used for printing purposes, the coating in the non-image areas is thermally sublimed off. The paper supports, which normally are not specially pre-treated, are not damaged in any way. An image results which corresponds exactly to the original. When transparent support material is used, the images may also be used as originals for further copying on any desired light-sensitive coatings.

Special effects can be achieved if phosphorescent pigments, such as cadmium sulfide, zinc sulfide, strontium sulfide, or silicates, or tungstates, which contain traces of a light-activating heavy metal such as bismuth, copper thallium, or silver are used for making the latent electrostatic image visible; when fixing is effected with solvent vapors such as trichloroethylene, the pigments remain adhered to the coating, which is made slightly soluble, and after the coating is sublimed off they become visible, with good contrast. The heating may be increased to such an extent that the pigments melt on or onto the support, or sinter on the support; this is especially the case when glass or other substances which soften at an elevated temperature, for example metals or enamel, are used as a support. In this case, a separate prior fixing is obviously unnecessary. The light-sensitive coating sublimes completely and rapidly so that no troublesome charred residues appear.

If this process is carried out several times with pigments of different color, multi-colored images or patterns can also be produced which are very resistant to mechanical or thermal stresses.

The invention will be further illustrated by reference to the following specific examples:

EXAMPLE 1

2.5 parts by weight of 2-(1,3-dioxo-hydrindyl-(2))-quinoline (the compound of Formula 1 above), 2.5 parts by weight of colophony and 0.05 part by weight of Rhodamine B extra are dissolved in 100 parts by volume of chloroform and the solution is applied to an aluminum foil. After evaporation of the solvent, a coating remains firmly adherent to the aluminum surface. After being given a negative charge by a corona discharge, the foil is exposed for 10 seconds under a positive original with a 100 watt lamp at a distance of 30 cm. and developed with a developer consisting of 100 parts by weight of small glass balls and 5 parts by weight of a toner consisting of zinc beryllium silicate with traces of manganese. The toner is positively charged and is attracted by the negative charge image. A positive image of the original is obtained and this image is rendered fast to wiping by the action of trichloroethylene vapors. After the foil is heated to 300° C., the coating sublimes in the non-image areas, so that on the aluminum surface a bright red image is obtained which may be used for advertising purposes for example.

EXAMPLE 2

A mixture of 2 parts by weight of the compound of Formula 3 and 2 parts by weight of the compound of Formula 4 with 0.003 part by weight of methyl violet is dissolved in 100 parts by volume of chloroform and the solution is applied to a paper coated with aluminum. After evaporation of the solvent, a coating remains firmly adherent to the aluminum surface. The coating is negatively charged by a corona discharge and exposed under a positive original. As a developer, a toner consisting of powdered cadmium silicate with traces of manganese is used, and iron powder is used as carrier substance. After the image has been fixed with trichloroethylene vapor, the coating in the non-image areas is sublimed off in vacuo at about 150° C. A bright yellow-orange image is obtained on the aluminum surface.

EXAMPLE 3

The same procedure is followed as in Example 2, but using instead a developer which contains a comminuted melt of polystyrene and a pigment as toner, and iron powder as carrier. The powder image is heated to 220° C., the resin-like components of the toner melting, while the coating which is not covered sublimes off. An image results which is marginally sharp and corresponds to the original.

It will be obvious to those skilled in the art that many modifications may be made within the scope of the present invention without departing from the spirit thereof, and the invention includes all such modifications.

What is claimed is:

1. A process for the production of an image which comprises exposing an electrostatically charged, supported, sublimable, photoconductive insulating layer to light under a master, developing the resulting latent electrostatic image with an electroscopic material, and fixing the developed image, the photoconductive insulating layer comprising as the sole photoconductor a compound having the formula

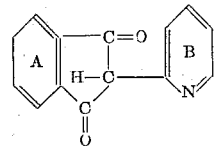

in which the rings A and B may be substituted by at least one member selected from the group consisting of an aromatic group, an aliphatic group, an alkoxy group and halogen.

2. A process according to claim 1 in which the photoconductive insulating layer is sublimed off of the support before fixing by heating to an effective subliming temperature.

3. A process according to claim 1 in which the photoconductive insulating layer is sublimed off the support simultaneously with fixing by heating to an effective subliming temperature.

4. A process according to claim 1 in which the photoconductive insulating layer is sublimed off of the support after fixing by heating to an effective subliming temperature.

5. A process according to claim 1 in which the photoconductive insulating layer includes a sublimable additive for increasing the sensitivity thereof.

6. A process according to claim 1 in which the photoconductive insulating layer includes a sublimable additive for improving the uniformity thereof.

7. A process according to claim 1 in which the compound has the formula

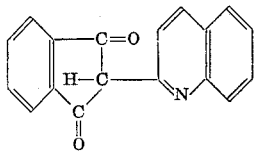

8. A process according to claim 1 in which the compound has the formula

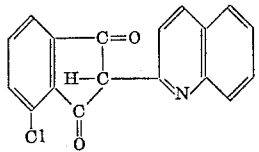

9. A process according to claim 1 in which the compound has the formula

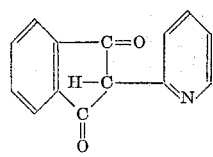

10. A process according to claim 1 in which the compound has the formula

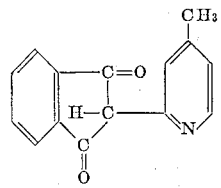

11. A process according to claim 1 in which the compound has the formula

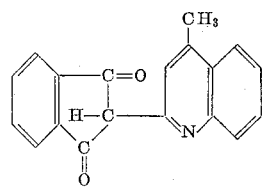

12. An electrophotographic material comprising a conductive support layer having a sublimable photoconductive insulating layer thereon, the latter comprising as the sole photoconductor a compound having the formula

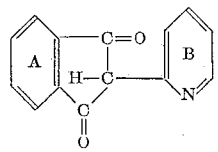

in which the rings A and B may be substituted by at least one member selected from the group consisting of an aromatic group, an aliphatic group, an alkoxy group and halogen.

13. An electrophotographic material according to claim 12 in which the photoconductive insulating layer includes a sublimable additive for increasing the sensitivity thereof.

14. An electrophotographic material according to claim 12 in which the photoconductive insulating layer includes a sublimable additive for improving the uniformity thereof.

15. An electrophotographic material according to claim 12 in which the compound has the formula

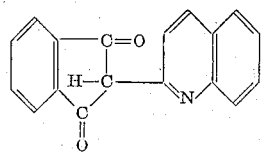

16. An electrophotographic material according to claim 12 in which the compound has the formula

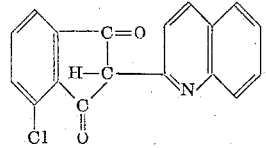

17. An electrophotographic material according to claim 12 in which the compound has the formula

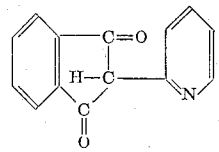

18. An electrophotographic material according to claim 12 in which the compound has the formula

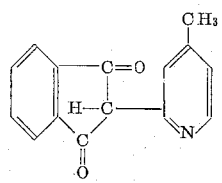

19. An electrophotographic material according to claim 12 in which the compound has the formula

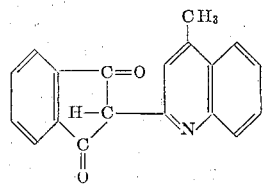

References Cited by the Examiner
UNITED STATES PATENTS

| | | | |
|---|---|---|---|
| 2,297,691 | 10/1942 | Carlson | 96—1 |
| 3,069,365 | 12/1962 | Shely | 56—1 |
| 3,108,109 | 10/1963 | Clarke | 260—289 |
| 3,189,447 | 6/1965 | Neugebauer et al. | 96—1 |

NORMAN G. TORCHIN, *Primary Examiner.*

C. E. VAN HORN, *Assistant Examiner.*